UNITED STATES PATENT OFFICE.

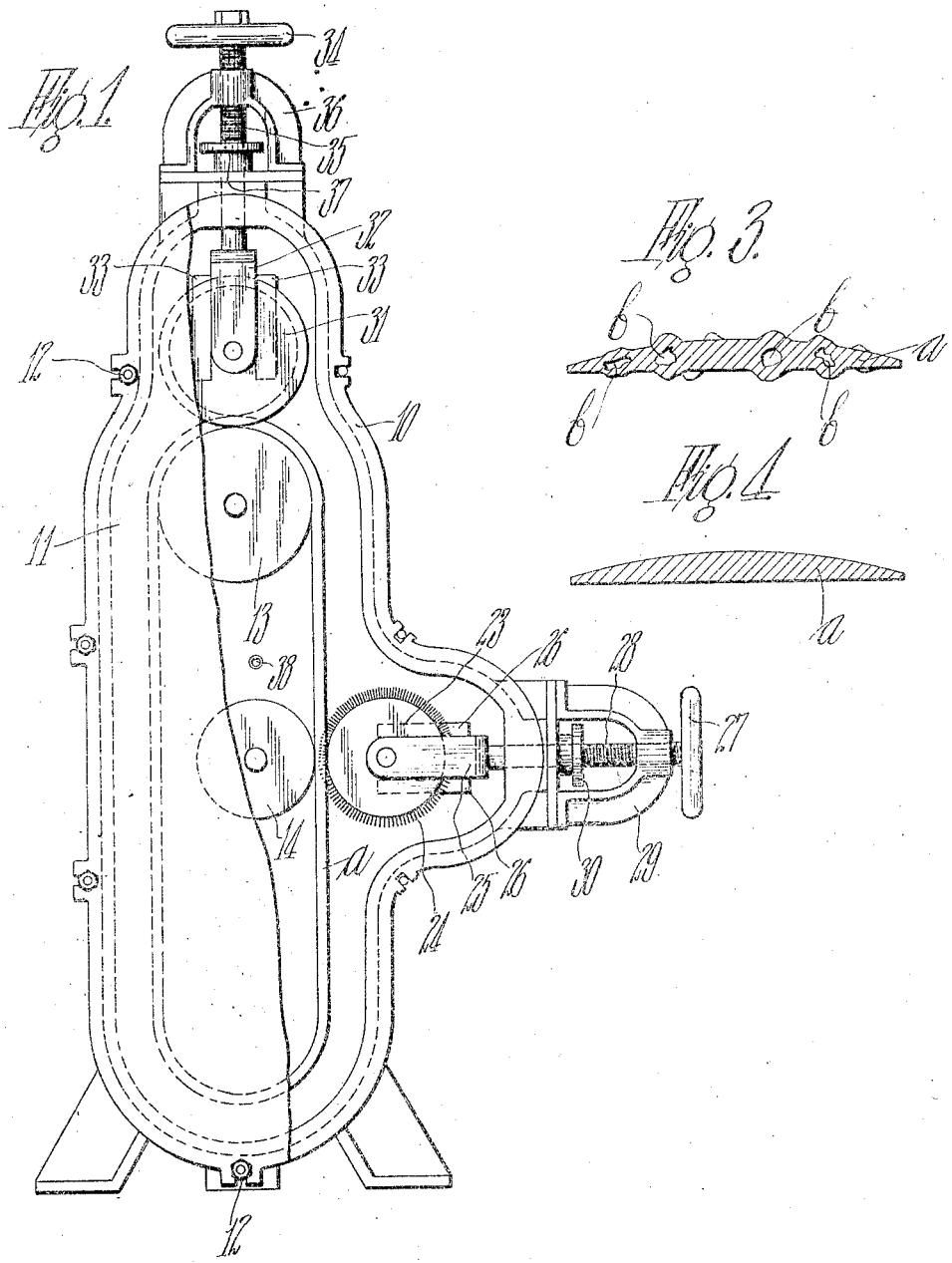

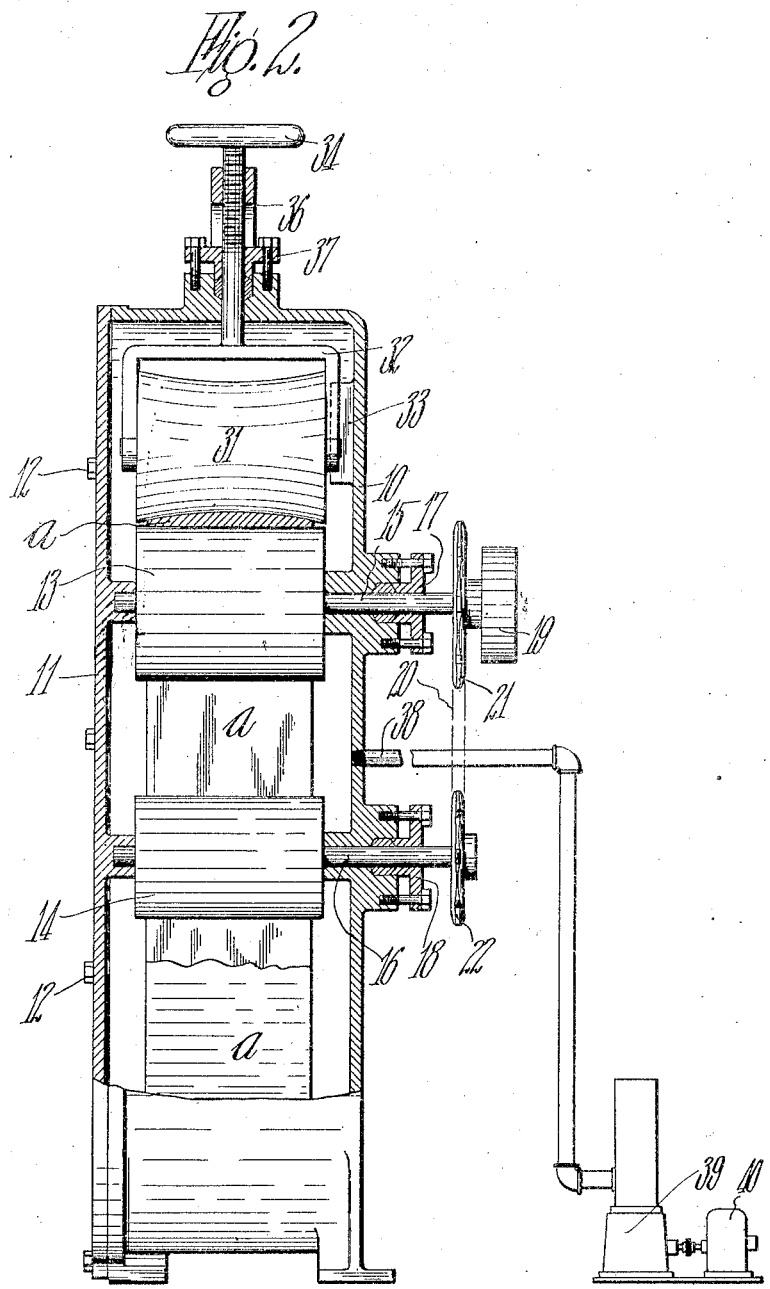

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND MACHINE FOR REMOVING AIR FROM RUBBER ARTICLES.

1,335,124.  Specification of Letters Patent.  Patented Mar. 30, 1920.

Application filed May 20, 1919. Serial No. 298,532.

*To all whom it may concern:*

Be it known that I, THOMAS MIDGLEY, a citizen of the United States of America, residing at Springfield, in the county of Hampden and State of Massachusetts, have invented certain new and useful Improvements in Methods and Machines for Removing Air from Rubber Articles, of which the following is a specification.

My invention relates to a method and a machine for removing air from rubber articles, particularly the rubber treads which are used on automobile tire casings.

It has for its object the removal from rubber tire treads or other articles of the air which becomes entrapped within the body of the rubber during the working and fabrication thereof. It also has for its object the compacting of the material of the tread or other article after the air has been removed. It also has further objects which will appear from the description and claims.

During the preparation of crude rubber and in the steps of forming the prepared rubber into its final shape, much air becomes entrapped in the rubber as the latter is worked and kneaded and folded upon itself. This gives a spongy, unhomogeneous character to the rubber, and greatly reduces its strength. Also, when the rubber is later heated during the process of vulcanization the air expands, producing bubbles which frequently break through the surface of the rubber.

In the manufacture of rubber treads for tire casings and rubber articles generally there are several steps at which this air may be entrapped. During all the working of the rubber to incorporate the various ingredients and secure homogeneity the rubber is rolled and folded incessantly, and air becomes thoroughly incorporated in the body of the rubber. Later, a similar action takes place when the rubber is being given its working or warming up immediately prior to its formation into sheets or into the long partially shaped strip from which the threads are cut. In the actual formation of the sheet or strip, whether this is done in a calender or in a tubing mill, no opportunity is given for the escape of the air, and it is embedded even more securely in the body of the rubber.

My invention is specifically intended to remove the pocketed air from the nearly finished tread, preferably when it has been formed in a strip of the cross section desired, and has had its ends joined so that it is in the form of an endless band. It will be understood that the cross-section given preferably approximates that which the tread is finally to assume upon vulcanization, but my process may be carried out while the tread is in any desired preliminary or final form, the rubber being substantially uncured. I accomplish this, in brief, by perforating the strip with a plurality of holes, thereby giving the pocketed air access to the surface of the rubber; and subjecting the perforated tread to a vacuum, thereby drawing the air from the pockets. Preferably the tread is then subjected, while still located in a vacuum, to a compression which will close the pores of the rubber, preventing the return of air to within the body of the tread when the vacuum is broken, and compacting the rubber itself more firmly together. In case a rubber article not a tire tread is being made it is formed to the desired preliminary or final shape, perforated with a plurality of small holes, subjected to a vacuum, and preferably compacted while under the influence of the vacuum, in the same manner as is described for a tire tread.

I accomplish this, in the preferred embodiment of my invention, as disclosed in a machine designed specifically to remove air from rubber tire treads, by a mechanism such as is shown in the accompanying drawings, in which—

Figure 1 is a side elevation of such mechanism, a portion of the casing being broken away to show the construction more clearly;

Fig. 2 is a vertical section thereof;

Fig. 3 is a section of the tread, showing the enlargement of the air bubbles due to the vacuum; and Fig. 4 is a section of the tread, showing the tread after the bubbles have been pricked, the air removed, and the rubber finally compacted.

The operating parts are contained within a casing 10, closed by a cover 11 which is held in place by bolts 12. Any suitable packing is provided between the cover and casing to make the joint air tight. Journaled in bearings in the casing and cover are rolls 13 and 14. The shafts 15 and 16 of these rolls pass through stuffing boxes 17 and 18 to prevent leakage of air into the casing. Shaft 15 is provided with a pulley 19, by which it may be rotated from any suitable source of power; and shafts 15 and 16 are connected together by a chain 20 passing over sprockets 21 and 22.

Adjacent roll 14 is a roll 23, carrying on its surface a plurality of closely spaced needle points 24. This roll is journaled freely in a yoke 25 which slides in guides 26 secured to the casing. A hand screw 27 has a shank 28 threaded into a bracket 29 and pivoted to yoke 25, whereby the position of roll 23 relative to roll 14 may be varied. To prevent air leakage shank 28 passes through a stuffing box 30.

Adjacent roll 13 is a roll 31, preferably shaped to conform to the cross section of the tread, and journaled in a yoke 32 sliding in guides 33 on the casing. A hand screw 34 has a shank 35 threaded into a bracket 36 and pivoted to yoke 32, whereby roll 31 may be forced with the desired degree of pressure against roll 13. Shank 35 of the hand screw passes through a stuffing box 37 to prevent air leakage.

In operation, cover 11 is removed, hand screws 27 and 34 are backed off to separate rolls 23 and 31 from rolls 14 and 13, and a tread *a*, previously made in the form of an endless band of the desired length and cross-section, is placed over rolls 13 and 14. The hand screws are turned to bring their respective rolls into operative position. The cover is replaced, and the chamber inside the casing is connected to a vacuum pump through a pipe 38. The pump, shown diagrammatically at 39, may be operated by a motor 40. When a sufficient vacuum has been attained pulley 19 is set in rotation. This draws the tread past the needle points 24 and rotates roll 23, perforating the tread with closely spaced fine holes. The air liberated by the formation of the holes is removed by the vacuum pump. Fig. 3 gives a picture of the tread after the vacuum has been formed, showing the expansion of the air bubbles *b* due to the external reduction of pressure. As soon as the air is released the distended pockets will shrink, or entirely close up. It is desirable however, to insure that the closing of the pockets shall be complete, and for this purpose roll 31 is provided. The passage of the tread between this roll and roll 13 compresses the tread, closes the pockets, and, due to the tacky condition of the uncured rubber, renders the body of the tread exceedingly homogeneous and firm.

Although my invention has been illustrated in its application to rubber treads for tire casings, it extends to other articles. In this case the article is preferably formed before treatment according to this process into a shape approximating that which it is to assume upon vulcanization, but any desired preliminary or final shape may be given. Changes in the details of the apparatus may be made without departing from the spirit of the invention as defined in the appended claims.

I claim—

1. The method of removing entrapped air from uncured rubber articles comprising forming the article in the desired shape, perforating it with a plurality of small holes, and subjecting it to a partial vacuum.

2. The method of removing entrapped air from uncured rubber articles comprising forming the article in the desired shape, and perforating it with a plurality of small holes while it is subjected to a partial vacuum.

3. The method of removing entrapped air from uncured rubber articles comprising forming the article in the desired shape, perforating it with a plurality of small holes, subjecting it to a partial vacuum, and finally compacting the material of the article to close the holes.

4. The method of removing entrapped air from uncured rubber articles comprising forming the article in the desired cross section, perforating it with a plurality of small holes, and compacting the material of the article to close the holes, the perforating and compacting operations being carried out while the article is subjected to a partial vacuum.

5. The method of removing entrapped air from treads for tire casings comprising forming the tread in a strip of the desired length and cross section, perforating the tread with a plurality of small holes, and subjecting the tread to a partial vacuum.

6. The method of removing entrapped air from treads for tire casings, comprising forming the tread in an endless band of the desired length and cross section, perforating the tread with a plurality of small holes, subjecting the tread to a partial vacuum, and finally compacting the material of the tread to close the holes.

7. The method of removing entrapped air from treads for tire casings comprising forming the tread in an endless band of the desired length and cross section, perforating the tread with a plurality of small holes, and compacting the material of the tread to close the holes, the perforating and compacting operations being carried out while the tread is subjected to a partial vacuum.

8. In a device of the class described, a casing, means to exhaust air from the casing, and means within the casing for perforating an article with a plurality of small holes.

9. In a device of the class described, a casing, means to exhaust air from the casing, means within the casing to perforate an article with a plurality of small holes, and means within the casing for compacting the perforated article to close the holes.

10. In a device of the class described, means to support a tread, means to perforate the tread with a plurality of small holes, and means to subject the tread to a partial vacuum.

11. In a device of the class described, means to support a tread, means to perforate the tread with a plurality of small holes, means to compact the tread to close the holes and means to subject the tread to a partial vacuum during the operation of the perforating and compacting means.

12. In a device of the class described, a casing, means in said casing adapted to support a tread in the form of an endless band, means in the casing to perforate the tread with a plurality of small holes, and means to exhaust air from the casing.

13. In a device of the class described, a casing; means in said casing adapted to support a tread in the form of an endless band; a pair of coöperating rolls in said casing, one of which is provided with a plurality of needle points, and adapted to engage the tread to perforate the same with a plurality of small holes; and means to exhaust air from the casing.

14. In a device of the class described, a casing, a roller in said casing adapted to support a tread in the form of an endless band, a second roller coöperating with the first mentioned roller to compact the tread, means in the casing to perforate the tread with a plurality of small holes, and means to exhaust air from the casing.

15. In a device of the class described; a casing; a roller in said casing adapted to support a tread in the form of an endless band; a second roller coöperating with the first mentioned roller to compact the tread; a pair of coöperating rolls in said casing, one of which is provided with a plurality of needle points, adapted to engage the tread to perforate the same with a plurality of small holes; and means to exhaust air from the casing.

THOMAS MIDGLEY.